(12) United States Patent
Wiltrout et al.

(10) Patent No.: US 6,283,058 B1
(45) Date of Patent: Sep. 4, 2001

(54) FOAM PLASTIC BOAT AND METHOD OF MANUFACTURING SAME

(76) Inventors: Martin Wiltrout, 414 E. Main St., San Gabriel, CA (US) 91776; David Debow, 1001 Fremont Ave., South Pasadena, CA (US) 91030

( * ) Notice: Subject to any disclaimer, the term of this patent is extended or adjusted under 35 U.S.C. 154(b) by 0 days.

(21) Appl. No.: 09/553,703

(22) Filed: Apr. 20, 2000

(51) Int. Cl.[7] .................................................... B63B 5/24
(52) U.S. Cl. .................................................. 114/357; 114/352
(58) Field of Search ................................. 114/352, 355, 114/357, 359

(56) References Cited

U.S. PATENT DOCUMENTS

| | | | |
|---|---|---|---|
| 4,453,357 | 6/1984 | Zwilgmeyer | 114/357 |
| 4,512,275 | 4/1985 | Drumm | 114/363 |
| 5,133,276 | 7/1992 | Alesi, Jr. et al. | 114/263 |
| 6,021,732 | * 2/2000 | Hobbs | 114/357 |

* cited by examiner

Primary Examiner—Jesus D. Sotelo
(74) Attorney, Agent, or Firm—John E. Wagner; Robert C. Smith

(57) ABSTRACT

A plastic boat is formed of wide extruded polyethylene foam planks all external surfaces of which have a skin. Two such planks are heated and then folded 60°, such that the longitudinal halves are at a 120° included angle. While still hot, with one half assigned as the bottom and placed on a flat surface, the folded ends are forced inwardly and the plank allowed to cool. A vertical cut is made through two of the planks thus formed, each of which becomes a hull half. The exposed edges are heated to a molten state and the halves aligned and bonded together to form a completed hull. The top edges are trimmed to a desired angle and rounded. A pair of stabilizers and a pair of handles are cut from edges of planks, such that they have skin on their tops, bottoms and one edge and with a smooth curve at each end on their unskinned edges. The unskinned sides are heated until molten and the attachment areas of the hull are masked and heated and the members pressed against the hull with the curved ends forced inwardly against the hull to provide stabilizers and handles having smoothly curved skinned ends bonded to the hull. A keel and tail fin member is similarly bonded to the bottom and rear of the hull. The top edges of the boat and any unskinned edges of the keel and tail fin member are then coated with a rubberized paint.

16 Claims, 3 Drawing Sheets

FIG. 9·A

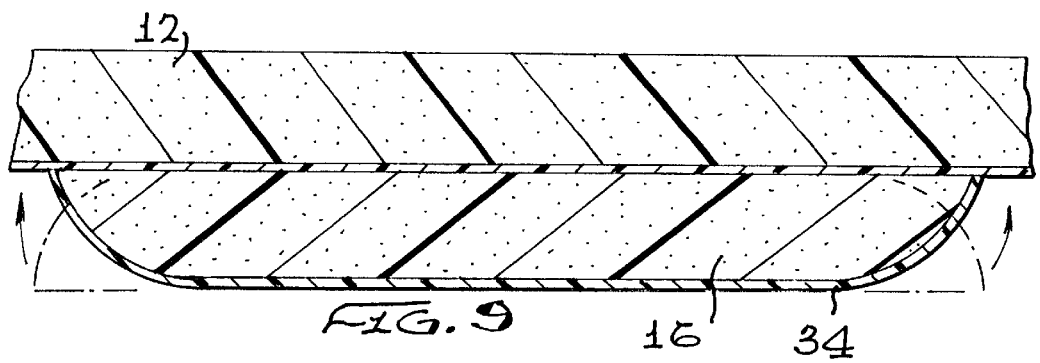
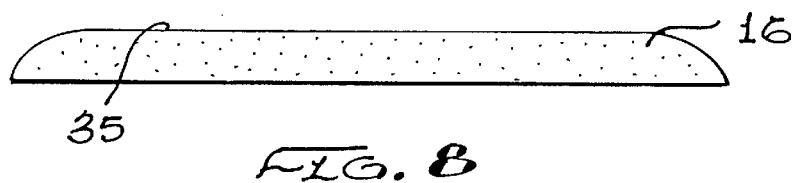
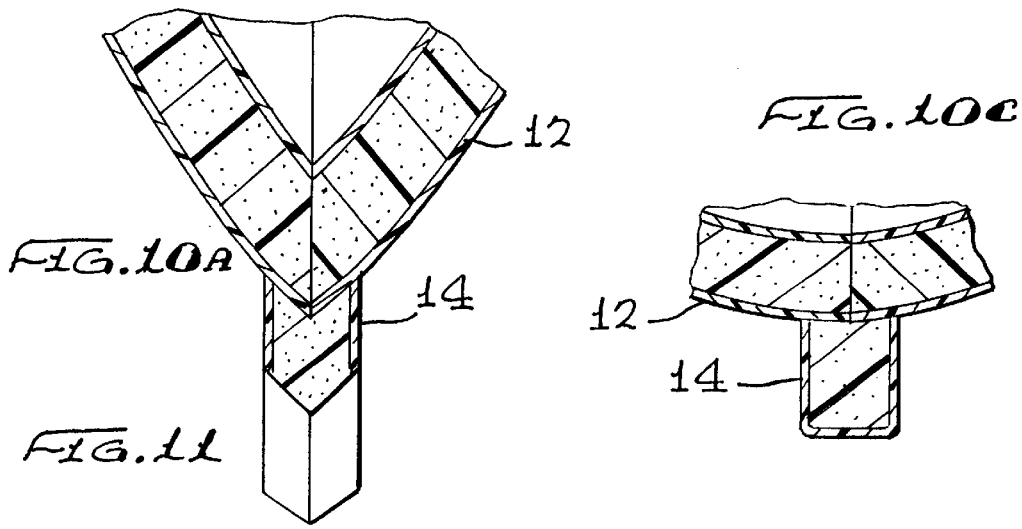
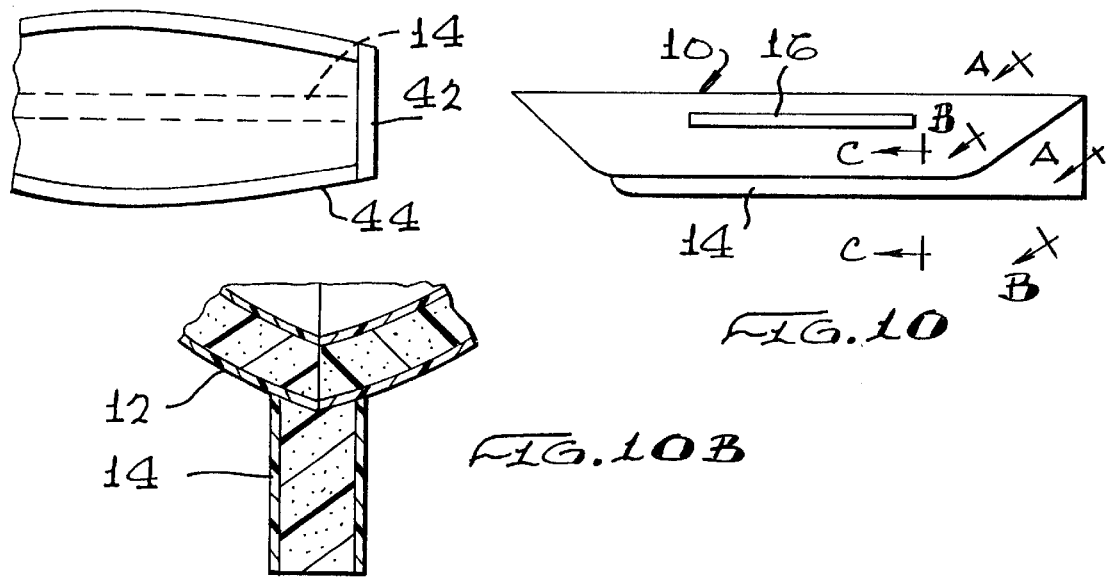

FOAM PLASTIC BOAT AND METHOD OF MANUFACTURING SAME

FIELD OF THE INVENTION

The present invention relates to boats, and more particularly to boats made of plastic foam and methods of construction of such plastic foam boats.

BACKGROUND OF THE INVENTION

Today's small boats, such as kayaks, canoes, and rafts are often heavy, bulky, and hard to transport and carry. If the user is lacking in experience, they can be difficult and dangerous to maneuver. Kayak designs have always leaned towards high-tech designs, and consequently, high consumer cost.

Most such small boats are made of rigid materials, and may have sharp objects attached, which can cut and bruise the user. Canoes are also relatively expensive and require skill to avoid capsizing. Because of this, many people, and particularly children, cannot get out on the water, limiting the sport to the more daring and skilled and/or to those able to make substantial expenditures of money for their watercraft.

As a way around the above problems, the plastic foam boat provides the user or users with a lightweight watercraft that is easy to transport and carry, soft to the touch, and very stable and easy to maneuver in water. Foam boats can be produced relatively inexpensively compared to the usual structure of kayaks and canoes. Their appearance is non-threatening and pleasing to the eye. Plastic foam boats can be made in many colors and color combinations, shapes and sizes.

The principal drawback of the plastic foam boats that have been available on the market is that they are designed to sell at a very low price and are quite fragile. Most have been quite small, made of styrofoam, and are useful only as children's toys for use in shallow pools or small ponds.

It is, therefore, an object of the present invention to provide a boat and method of manufacturing same which is inherently safer to use, particularly for children or the inexperienced, than the usual canoe or kayak.

It is another object of the present invention to provide a boat and method of manufacturing it which is lighter in weight and easier to carry and transport than the usual small boat.

It is a further object of the present invention to provide a boat of plastic foam construction, which enjoys the weight and safety advantages of plastic foam, but which is significantly more durable than plastic foam boats, which have heretofore been available.

It is a further object of the present invention to provide a boat meeting the above objects and which is substantially less expensive than canoes, kayaks or conventional boats of wood, glass fiber, or aluminum construction.

Other objects and advantages will become apparent from consideration of the following description taken in connection with the drawings.

SUMMARY OF THE INVENTION

Faced with the above situation, applicants have concluded that there is a place in the market for a boat which is substantially more durable than the small, inexpensive, plastic foam boats described above, but which is considerably less expensive than conventional boats of wood, glass fiber or aluminum, or kayaks or canoes.

Applicants have determined that commercially available planks of uni-cellular polyethylene foam, which are available in 2.72 m lengths, and which have an outer skin, make very desirable material for forming of plastic foam boats. Such planks are readily cut and can be bent and parts joined by heating.

Applicants have formed a boat from such planks by heating a first plank and then folding it longitudinally to provide a V-shaped cross section with an angle of about 60° (interior angle of about 120°). A second plank is similarly heated and bent while still hot, one side of each such bent plank is selected as a bottom, and then each V-shaped member is bent inwardly from about 80 cm from the ends, as shown in FIG. 5.

After the bent planks have cooled to room temperature, each is placed in a jig where the top edge is trimmed at 90° to the outer side surface over its entire length. The each bent plank is cut in a straight line at 90° from the bottom to produce two boat halves. The cut edges are then heated to a high temperature (around 500° F.) making them molten and the molten edges are aligned and pressed together creating a finished hull. The stabilizers, handles, and the keel and tail fin combination are all cut from the same foam plank material, as that used for the hull. These parts are heat bonded to the hull essentially as described, but the hull areas which must be heated to bond the above parts are masked to avoid distorting or damaging the adjacent surface of the hull.

The rear edge of the keel and the top edges of the hull are then painted with a rubberized paint to insure that no water leaks into the hull or the keel and tail fin.

DESCRIPTION OF THE DRAWINGS

In the drawings, closely related figures have the same number but different alphabetic suffixes.

FIG. 4 is a perspective view of a typical foam plank;

FIG. 4A is a sectional view taken along line 4A—4A of FIG. 4;

FIG. 8 shows an overhead view of the stabilizer as initially cut with an elongated curve at each end;

FIG. 10 shows a side view of the hull with the keel and tail fin combination attached;

FIGS. 10A to 10C are cross sectional views taken along lines A—A, B—B, and C—C of FIG. 10; and FIG. 11 is a fragmentary view of a boat disclosing another embodiment of the invention.

DESCRIPTION OF THE PREFERRED EMBODIMENT

Figure 1:
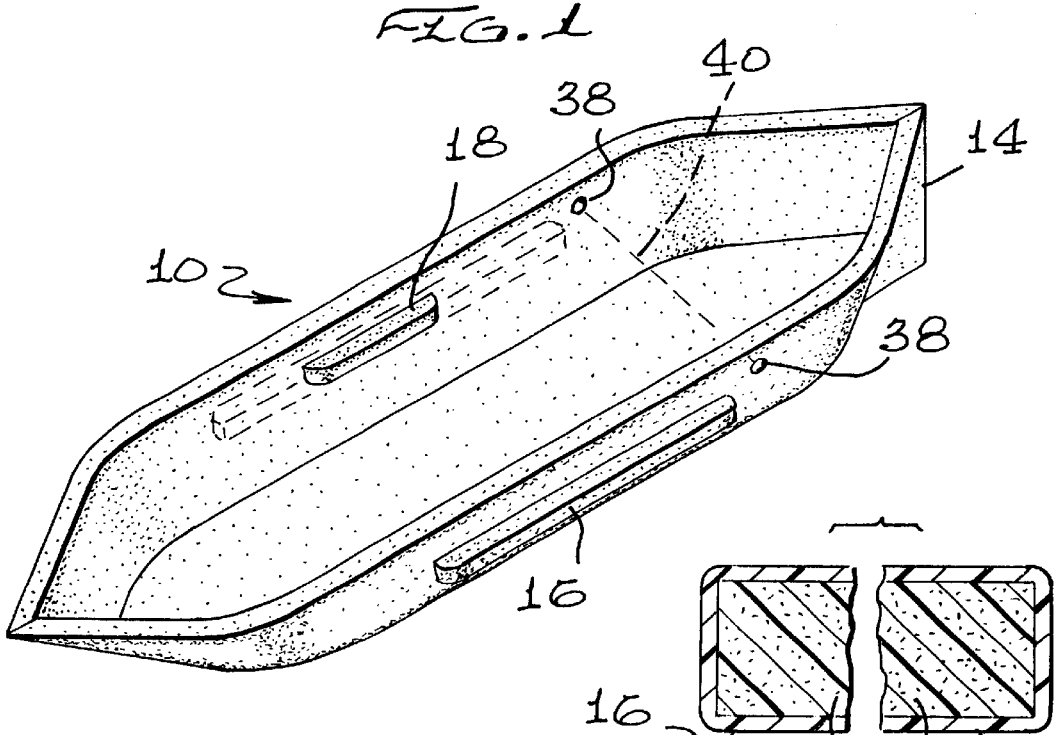
FIG. 1 is a perspective view of the applicants, plastic foam boat.
Figure 3:
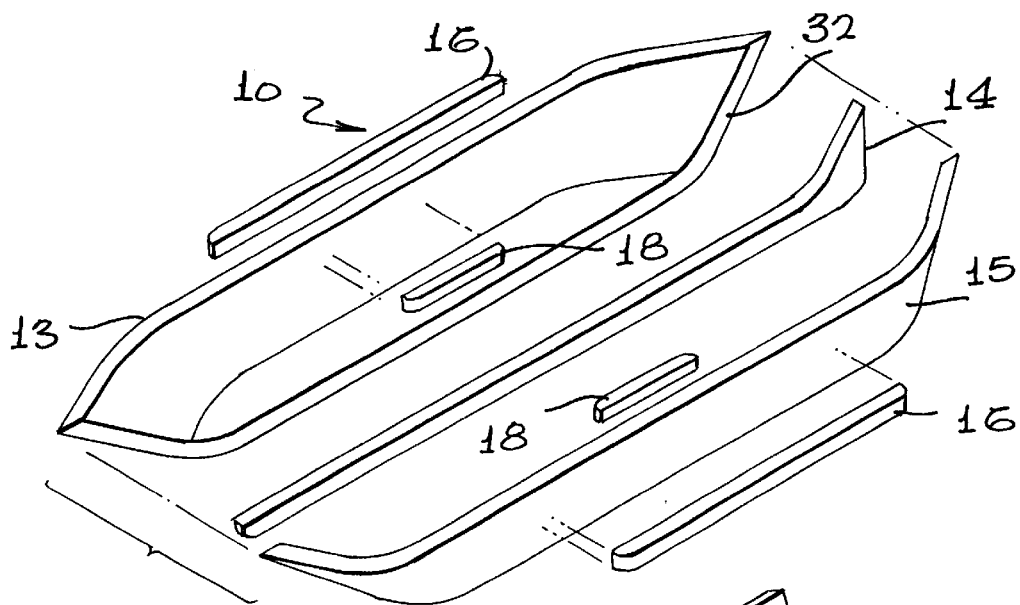
FIG. 3 is an exploded view of the foam boat.

In the preferred embodiment, FIGS. 1 and 3 show overall and exploded views, respectively, of a plastic foam boat 10 according to the invention. The foam boat consists of a hull 12 formed of two hull halves 13 and 15, two stabilizers 16, two handles 18, and one combined keel and tail fin member 14. Extruded planks of uni-cellular polyethylene foam are used. Foam planks of this type can be obtained from Sealed Air Corporation of Fairlawn, N.J. The planks used measure around 2.72 m in length, around 65 cm in width, and has a thickness of about 5-½ cm, having an outer skin thickness of around 1 to 3 mil. with a weight rating of 4.0 pounds per cubic foot.

Figure 5:
FIG. 5 is a perspective view of a foam plank, as folded.
Figure 6:
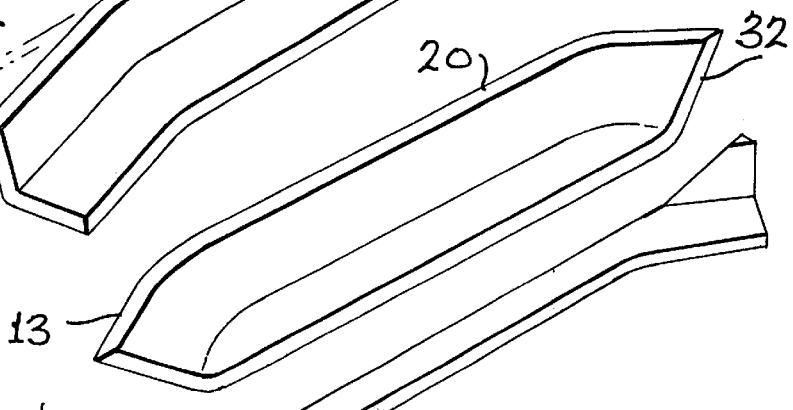
FIG. 6 is a perspective view of a folded foam plank after the ends are bent.

The foam plank 30 is first heated in an oven to around 240° F., making it pliable. The plank is then placed in a multi-bending jig and folded longitudinally through the center approximately 60°, as shown in FIG. 5. After assigning one plank as the bottom and placing it on a flat surface, the plank is bent inwardly while still hot from about 80 cm from both ends while the bottom outer surface remains on a horizontal plane, as shown in FIG. 6.

Figure 7:
FIG. 7 is a perspective view of a folded foam plank with the ends bent and the inner side cut away.

After the bent plank has cooled to room temperature, it is placed in two cutting jigs where the top edge 20 is cut at 90° to the outer side over its full length. Following this, the top inner and outer edges are radiused or rounded. Finally, the bent plank is cut in a straight line longitudinally at 90° to the bottom outer surface over its full length at about 35 cm from the outer side surface measured at the center of the top edge, thus forming one hull half 13 as shown in FIG. 7. The opposite hull half 15 is identical, since, for this particular design, the halves are symmetrical.

Figure 2:
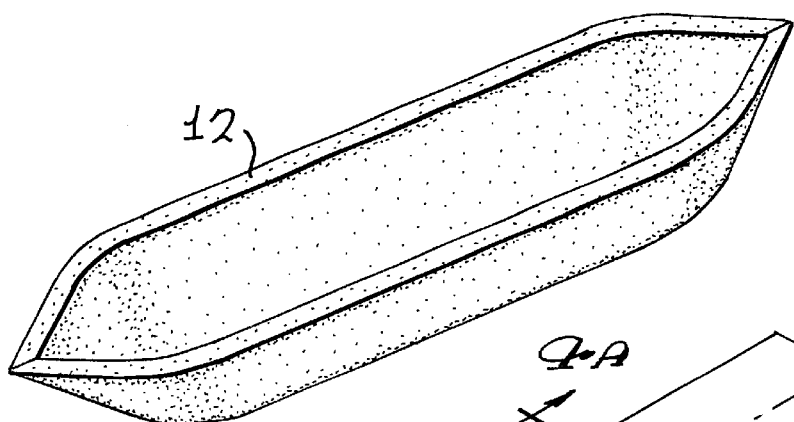
FIG. 2 is a perspective view of the finished hull.

One hull half 13 is heat bonded to the second hull half 15 by heating the surfaces of the cut edges 32 simultaneously to around 500° F. making them molten. While the surfaces are molten, they are aligned with each other and pressed together creating a finished hull 12, as shown in FIG. 2.

The stabilizers 16, handles 18, keel and tail fin combination 14, are all cut from foam plank material identical to that used for the hull halves. The stabilizers and handles may be approximately 5 cm wide and are cut from the longitudinal edge surface of the plank at 90° to the top and bottom surfaces. A cross section of these parts is shown in FIG. 4A wherein the outer skin layer 34 is present on the top, bottom and outer edge, and the cut inner edge 35 has no skin, and presents a raw edge of polyethylene foam 36. The stabilizers may be approximately 1 m in length and the handles about 40 cm in length. The unskinned ends of these parts are cut in an elongated curve beginning around 8 cm in from the ends leaving the skinned edge at full length, as shown in FIG. 8.

Figure 9:
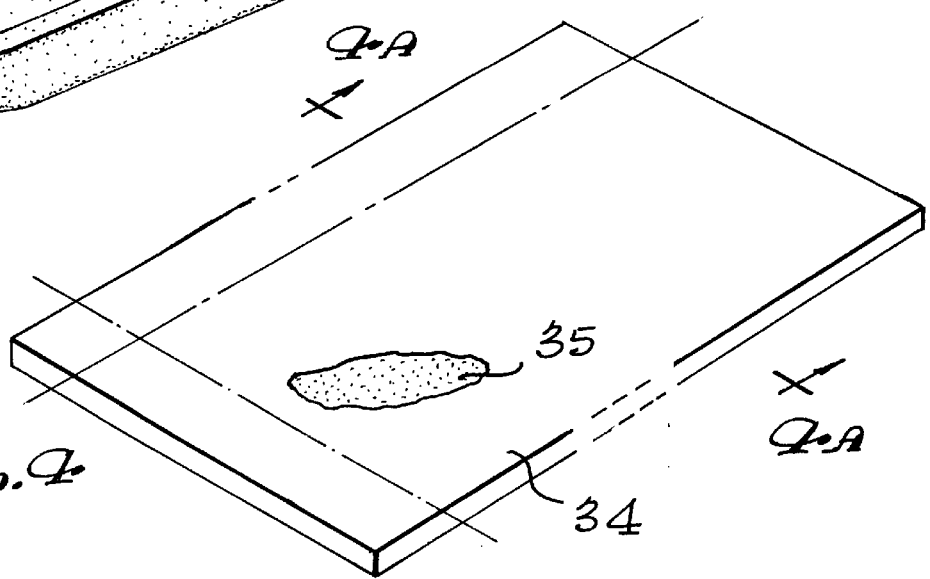
FIG. 9 is a sectional view showing the stabilizer as bonded to the hull's outer surface.

Areas of the hull 12 where the stabilizers are to be attached are masked to avoid damaging the skin surface adjacent to the stabilizers and handles, which is then heated to aid in bonding the stabilizers and handles. The two stabilizers 16 are then heated to a molten condition at their cut surfaces 35 and are then bonded to both outer side surfaces of the finished hull. They are preferably positioned about 13 cm from the top outer edge at a centered point along the side, as shown in FIGS. 1 and 3. While still very hot, the curved end portions of the cut stabilizer surfaces 35 are pressed around against the surface of the hull 12 resulting in an outer skinned surface on the stabilizer that curves into the skinned surface of the hull, as shown in FIG. 9. The same procedure is used for forming and attaching the two handles 18, which are heat bonded to the inner side surfaces of the hull approximately 4 cm from the top edge and centered along the sides as shown in FIGS. 1 and 3. By attaching the stabilizers 16 and the handles 18 as described, there are no exposed raw cut edges on these parts.

The keel and tail fin combination 14 extends from the front of the outer bottom to the top of the outer rear of the finished hull along the line where the hull halves 13 and 15 were joined. The keel portion is preferably cut approximately 5 cm in from the skinned longitudinal edge surface of a foam plank at 90° to the top and bottom surfaces. For the tail fin portion, the cut matches the curve and angles of the outer surface at the rear of the hull, as shown in FIGS. 10A, 10B and 10C, which show cross sectional views of the rear of the hull taken along lines A—A, B—B and C—C of FIG. 10. The outer rear edge of the tail fin may then be trimmed in a "V" pattern, as shown in FIG. 10A.

The forward end of the keel portion may be cut on an elongated curve in the same manner as the ends of the stabilizers 16 and handles 18, as shown in FIGS. 8 and 9. The completed keel and tail fin combination is then heat bonded to the center of the outer bottom and outer rear of the hull as described above. The curved cut on the forward end of the keel portion is pressed around to the surface of the hull while still very hot in the same manner as were the ends of the stabilizers and handles described in connection with FIG. 8.

The "V" cut on the tail fin and the top cut on the hull are then sealed with an application of a flexible rubber coating, such as a rubberized paint. To avoid waste of material, it may be preferred to cut the entire keel and tail fin member 14 from parts of a plank not having skin on an edge. In such case, the rubberized paint would also be used to seal the entire length of member 14.

Coatings of this type are available in a variety of colors and are obtainable from P D I Inc. of Circle Pines, Minn. After the coating is applied and has dried, it is flash heated at around 500° F., thus improving the bond to the foam.

In the embodiment described above, the plastic foam boat is designed for a single adult operator. The operator propels the boat with the use of a double-ended paddle. The boat 10 (FIG. 1) is highly buoyant when placed in water. The keel and tail fin combination 14 assists in causing the boat to track in a straight line when propelled forward. The two stabilizers 16 cancel out side-to-side sway and also assist in tracking. The two handles 18 enable the user to carry the boat conveniently.

Thus, the reader will see that the plastic foam boat of this invention provides the user with a relatively low cost, lightweight, highly buoyant watercraft that is very agile, stable, and sturdy, while being soft to the touch, as compared to prior art.

The above-described boat and method of manufacturing it are only exemplary of the present invention. Many variations are possible. For example, one can make a boat following most of the above teachings, which has a flat back panel or transom, by bending only one end of the folded plank while leaving the other end straight, cutting the folded and bent planks, as described above to provide hull halves and then securing the halves together, as described above. Alternatively, the ends of the folded planks could be folded and bent as described above, but with one end being bent somewhat less than the other. One would then cut a flat piece from the plank material to provide the closed end or transom member 42, and heat bond it to the hull 44, as shown in FIG. 11. Other steps could be essentially as described. A gas or electrically powered motor can then be attached to the transom, if desired. Similarly, a sail may be fitted by adding simple support means. Such support means could include a foam molded deck extending over a substantial part of the open top, with a reinforcing layer secured to the bottom by heating it until molten and attaching it, as described above.

The size of the plastic foam boat, which is produced can vary depending upon the size and numbers of planks used. Larger boat hulls can be made using larger planks. Applicants have built a longer boat by cutting a finished hull across in the middle and bonding in a center section between the halves. If the load is of a certain weight and configuration, the boat may tend to bow or spread apart between the top edges. Applicants have provided simple plastic anchors 38 which pass through the sides of the hull near the top edge, to which a strip 40 may be attached to prevent such bowing. At some greater increase in size additional internal bracing would be required. Obviously, a pair of hulls, such as those described above, can be tied together with a deck to provide a catamaran.

The foregoing description describes the preferred embodiment of this invention and is representative of its principles but should not be considered as limiting. It is clear that one could, following the teaching of this patent, depart from the physical appearance or structure without departing from the principles of this invention which are defined as set forth in the following claims, including the protection afforded by the doctrine of equivalents.

We claim:

1. For use in manufacturing a boat of polyethylene foam, a method of attaching an elongated polyethylene foam member having a surface skin to a hull of said boat having a surface skin comprising:
   a) cutting said member from an edge of a polyethylene foam plank such that said member has a top, a bottom, one elongated edge having skin, and an elongated unskinned edge;
   b) forming a gradual curve on at least one end of said unskinned edge tapering toward said skinned edge;
   c) heating said unskinned edge and an area of said hull where it is desired to attach said member;
   d) pressing said heated member against the heated area of said hull and forcing said unskinned curved end against said hull to provide a member having skin over the entire curved end surface.

2. A method as claimed in claim 1 wherein said member is cut to provide gradual curves on said elongated, unskinned edge at each end thereof and following heating said unskinned edge and said hull, both of said ends are pressed against said hull, whereby the entire exposed surface of said member is covered with said surface skin.

3. A method as claimed in claim 1 wherein a plurality of said members are cut from at least one said plank and one of said members is cut to include a tail fin at the opposite end from said end having a gradual curve and said one member is heat bonded to said hull.

4. In a process for manufacturing a boat of extruded polyethylene foam planks, a method of forming a hull comprising:
   a) heating a pair of said planks and folding them longitudinally so that the folded halves are bent approximately 60°,
   b) while still hot, assigning one half to be the bottom and bending a desired proportion of each half inwardly from at least one end while maintaining the bottom on a flat surface and allowing the bent planks to cool,
   c) making a cut through each folded plank perpendicular to the bottom to form a half hull having a cut edge, and
   d) heating the cut edges of said half hulls until molten, aligning said hull halves and pressing them together to create a completed hull.

5. A process as claimed in claim 4 wherein following step d) a transom of polyethylene is bonded to said hull.

6. A process for manufacturing a boat as claimed in claim 4 further comprising attaching an elongated member to said hull including
   a) cutting said elongated member from an edge of a polyethylene plank, said strip having an elongated unskinned edge,
   b) forming a gradual curve on each end of said unskinned edge of said member tapering toward said elongated skinned edge;
   c) heating said unskinned edge and an area of said hull where said member is to be attached;
   d) pressing the heated unskinned edge of said member against said area and forcing the ends of said member against said hull.

7. A process as claimed in claim 6 wherein following step d) all unskinned surfaces of said boat are painted with rubberized paint.

8. A method of producing a boat from planks of extruded polyethylene foam plastic having a skin on their surfaces, comprising the steps of:
   a) heating a pair of polyethylene foam plastic planks to about 240° F. and folding them longitudinally so that the folded halves are at an included angle of approximately 120°,
   b) assigning one half of each folded plank to be the bottom and, while still hot, bending a desired proportion of each half inwardly from each end, while maintaining the bottom on a flat surface and allowing the bent planks to cool to room temperature,
   c) making a longitudinal cut through each folded plank perpendicular to the bottom to form a half hull,
   d) heating the cut edges of said hull halves until molten, aligning said hull halves and pressing them together to create a completed hull,
   e) forming a plurality of stabilizers from said plank by cutting a desired length and width from an edge of said plank having skin,
   f) forming a plurality of handles from said plank, by cutting a desired length and width from an edge of said plank having skin,
   g) forming a keel and tail fin member from said plank,
   h) heat bonding said stabilizers, said handles and said keel and tail fin member to said hull, and
   i) coating unskinned surfaces of said boat with rubberized paint and heating said paint to assure a bond to said boat.

9. A boat formed of polyethylene foam plastic planks having a skin on their surfaces, said boat comprising:
   a hull formed of a plurality of said planks formed as hull halves and bonded together,
   stabilizers cut from said foam plastic planks and heat bonded to the outside of said hull,
   carrying handles cut from said foam plastic planks and bonded to the center of the inside walls of said hull,
   a keel and tail fin member cut from said planks and heat bonded to the bottom and to the joined rear edge of said hull.

10. A plastic foam boat as claimed in claim 9 wherein said stabilizers and said handles are cut from the edges of said planks having skin, such that the top, bottom and one edge of said stabilizers and handles have skin.

11. A plastic foam boat as claimed in claim 9 wherein the ends of said stabilizers and said handles are curved and are entirely covered with skin.

12. A plastic foam boat as claimed in claim 9 wherein said keel and tail fin member is cut from an edge of one of said planks having skin.

13. A plastic foam boat as claimed in claim 9 wherein the top edges of said hull are trimmed approximately perpendicular to the adjacent outside surfaces of said hull, have smoothly rounded edges, and are painted with rubberized paint.

14. A plastic foam boat as claimed in claim 9 wherein all unskinned surfaces of said boat have a coating of rubberized paint.

15. A plastic foam boat as claimed in claim 9 wherein a flat polyethylene foam transom is bonded to the rear of said hull halves.

16. A plastic foam boat as claimed in claim 9 further comprising a pair of fastening members secured to opposite sides of said boat and a strap is connected between said fastening members.

* * * * *